United States Patent
Corrie

(10) Patent No.: US 9,852,054 B2
(45) Date of Patent: Dec. 26, 2017

(54) ELASTIC CACHING FOR JAVA VIRTUAL MACHINES

(75) Inventor: Benjamin J. Corrie, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1094 days.

(21) Appl. No.: 13/460,556

(22) Filed: Apr. 30, 2012

(65) Prior Publication Data

US 2013/0290641 A1    Oct. 31, 2013

(51) Int. Cl.
*G06F 12/02*    (2006.01)
*G06F 12/121*    (2016.01)
*G06F 12/0875*    (2016.01)
*G06F 9/50*    (2006.01)

(52) U.S. Cl.
CPC .......... *G06F 12/023* (2013.01); *G06F 9/5022* (2013.01); *G06F 12/0875* (2013.01); *G06F 12/121* (2013.01); *G06F 9/5077* (2013.01); *G06F 12/0276* (2013.01); *G06F 2212/1016* (2013.01); *G06F 2212/151* (2013.01)

(58) Field of Classification Search
None
See application file for complete search history.

(56) References Cited

U.S. PATENT DOCUMENTS

| 5,493,663 | A | 2/1996 | Parikh |
| 5,606,685 | A | 2/1997 | Frandeen |
| 6,202,127 | B1 | 3/2001 | Dean et al. |
| 6,496,912 | B1 | 12/2002 | Fields, Jr. et al. |
| 6,789,156 | B1 | 9/2004 | Waldspurger |
| 7,412,492 | B1 | 8/2008 | Waldspurger |
| 7,421,533 | B2 | 9/2008 | Zimmer et al. |
| 7,433,951 | B1 | 10/2008 | Waldspurger |
| 7,472,252 | B2 | 12/2008 | Ben-Zvi |
| 7,500,048 | B1 | 3/2009 | Venkitachalam et al. |
| 7,640,543 | B2 | 12/2009 | Vij et al. |
| 7,702,843 | B1 | 4/2010 | Chen et al. |
| 7,716,446 | B1 | 5/2010 | Chen et al. |
| 7,797,699 | B2 | 9/2010 | Kagi et al. |
| 7,870,153 | B2 | 1/2011 | Croft et al. |
| 7,886,126 | B2 | 2/2011 | Bennett et al. |
| 8,095,931 | B1 | 1/2012 | Chen et al. |

(Continued)

OTHER PUBLICATIONS

Patent Cooperation Treaty, "International Search Report", issued in connection with International Patent Application No. PCT/US2011/042388, dated Aug. 30, 2011 (3 pages).

(Continued)

*Primary Examiner* — Charles Rones
*Assistant Examiner* — Ryan Dare

(57) ABSTRACT

A mechanism is provided for managing memory of a runtime environment executing on a virtual machine. The mechanism includes an elastic cache made of objects within heap memory of the runtime environment. When the runtime environment and virtual machine are not experiencing memory pressure from a hypervisor, the objects of the elastic cache may be used to temporarily store application-level cache data from applications running within the runtime environment. When memory pressure from the hypervisor is exerted, the objects of the elastic cache are re-purposed to inflate a memory balloon within heap memory of the runtime environment.

21 Claims, 6 Drawing Sheets

(56) References Cited

U.S. PATENT DOCUMENTS

| | | |
|---|---|---|
| 8,156,492 B2 | 4/2012 | Dahlstedt |
| 8,359,451 B2 | 1/2013 | Chen et al. |
| 8,543,790 B2 | 9/2013 | Chen et al. |
| 8,583,875 B1 | 11/2013 | Garthwaite et al. |
| 8,949,295 B2 | 2/2015 | McDougall et al. |
| 9,015,203 B2 | 4/2015 | Corrie |
| 2001/0044856 A1 | 11/2001 | Agesen et al. |
| 2002/0019716 A1 | 2/2002 | Agesen et al. |
| 2003/0212719 A1 | 11/2003 | Yasuda et al. |
| 2005/0232192 A1 | 10/2005 | Rawson |
| 2005/0262505 A1 | 11/2005 | Esfahany et al. |
| 2006/0004944 A1 | 1/2006 | Vij et al. |
| 2006/0064697 A1 | 3/2006 | Kagi et al. |
| 2006/0161719 A1 | 7/2006 | Bennett et al. |
| 2007/0038837 A1 | 2/2007 | Ben-Zvi |
| 2007/0136402 A1 | 6/2007 | Grose et al. |
| 2007/0192329 A1 | 8/2007 | Croft et al. |
| 2009/0070776 A1 | 3/2009 | Dahlstedt |
| 2010/0211754 A1 | 8/2010 | Crosby et al. |
| 2010/0241785 A1 | 9/2010 | Chen et al. |
| 2011/0320682 A1* | 12/2011 | McDougall et al. ............. 711/6 |
| 2012/0110577 A1 | 5/2012 | Chen et al. |
| 2012/0185854 A1 | 7/2012 | Dahlstedt |
| 2012/0233435 A1* | 9/2012 | Ben-Yehuda et al. ........ 711/170 |
| 2013/0132957 A1 | 5/2013 | Chen et al. |
| 2013/0218644 A1 | 8/2013 | Kasravi et al. |
| 2013/0290382 A1 | 10/2013 | Adachi et al. |
| 2013/0290596 A1 | 10/2013 | Corrie |
| 2013/0339568 A1 | 12/2013 | Corrie |

OTHER PUBLICATIONS

Patent Cooperation Treaty, "Written Opinion of the International Search Authority," issued in connection with International Patent Application No. PCT/US2011/042388, dated Aug. 30, 2011 (4 pages).

Patent Cooperation Treaty, "International Preliminary Report on Patentability," issued in connection with International Patent Application No. PCT/US2011/042388, dated Jan. 8, 2013 (5 pages).

Heo et al., Memory overbooking and dynamic control of Xen virtual machines consolidated environments, ASPOLOS RESOLVE—Workshop on Runtime Environments/Systems, Layering and Virtualized Environments, 2011.

Schwidefsky et al., Collaborative Memory Management in Hosted Linux Environments:, Proceedings of the Linux Symposium, vol. 2, pp. 313-328,206.

Tauber, "Automation and Optimization in IT-DB Oracle VM virtualization Systems", CERN openlab, Aug. 20, 2010.

C.A. Waldspurger, "Memory Resource Management in VMWare ESX Server" Proceedings of the 5th Symposium on Operating Systems Design and Implementation (OSDI 2002), AMC Operating Systems Review, pp. 181-194, Dec. 2002.

Gordon et al., "Ginko Automated, Application-Driven Memory Overcommitment for Could Computing", ASPOLOS RESOLVE—Workshop on Runtime Environments/Systems, Layering and Virtualized Environments, 2011.

* cited by examiner

ELASTIC CACHING FOR JAVA VIRTUAL MACHINES

CROSS-REFERENCE TO RELATED APPLICATION(S)

This application is related to the patent application entitled "Hybrid In-Heap Out-of-Heap Ballooning for Java Virtual Machines" Ser. No. 13/460,565, which is assigned to the assignee of this application and have been filed on the same day as this application.

BACKGROUND

Virtual computing environments allow multiple virtual machines (VMs) to run on a single physical platform (also referred to herein as a "host") and to share physical resources. Some virtual computing environments enable configuration of VMs such that the total amount of memory designated for use by the VMs is larger than the actual amount of memory available on the host. Referred to as memory over-commitment, this feature enables the host to support the simultaneous execution of more VMs. To achieve over-commitment, the virtual computing environment simply gives a VM less memory than what the guest operating system (OS) in the VM believes it has.

Memory over-commitment is traditionally enabled using a technique known as ballooning, which is described in U.S. Pat. No. 7,433,951, the entire contents of which are incorporated by reference herein. A balloon is a resource reservation application that runs as a guest application in the VM or as driver in the guest OS that requests guest physical memory from the guest OS. After the guest OS has allocated guest physical memory for use by the balloon application, the balloon application is able to ultimately communicate information regarding the allocated guest physical memory to a hypervisor that supports the VM, which is then able to repurpose the host's system memory (also referred to herein as "machine memory") backing the guest physical memory allocated to the balloon application. That is, since the balloon application only reserves guest physical memory but does not actually use it, the hypervisor can, for example, repurpose machine memory that backs such allocated guest physical memory for use by another VM without fear that the balloon application would write to the guest physical memory (and therefore the backed machine memory).

Another technique for memory management that is useful under memory over-commitment situations is referred to as page sharing. In this technique, the virtual computing environment identifies and eliminates redundant copies of guest physical memory pages across VMs. The virtual infrastructure maps the identical guest physical pages to the same machine memory page and enables copy-on-write behavior with regards to that machine memory page. This technique enables sharing of memory between VMs in cases where VMs may be running instances of the same guest OS, applications, and libraries, and have other data in common.

Unfortunately, there are applications and runtime environments that do not work well with conventional memory over-commitment in virtual computing environments. Java Virtual Machine (JVM) is one of the most widely used runtime environments in this category. JVMs typically have their own memory management mechanisms. Allocated Java objects sit in a JVM heap until the JVM runs out of heap space, and in this event, garbage collection sweeps the heap and recycles dead objects, which are the objects unreachable from the program. A memory-managed JVM runtime can be a problematic candidate for memory over-commitment because freed memory made available by garbage collection is typically held exclusively for the use of the runtime and therefore cannot be used by other applications running in the operating system or virtualized infrastructure. In this environment, attempts to over-commit the memory may result in lack of memory to support the JVM heap, causing a significant performance hit.

Such issues with memory over-commitment may be further exacerbated as a result of memory usage by certain applications running within a JVM. Notably, production-level applications typically use some form of caching to increase responsiveness and performance. However, application-level caches may continue to take up space in heap memory even though the JVM and underlying VM may be experiencing memory pressure. Some caching mechanisms have used "soft referenced" objects to permit a garbage collection to reclaim space from the cache. However, in practice, some JVMs may be slow to remove soft referenced objects even though the JVM may be under memory pressure. Further, applications generally have no control over the timing and scope of a garbage collection operation. For example, applications lack control over which soft referenced objects in the cache may be removed (i.e., garbage collected) and are unable to make a distinction between "hot" cache entries and "cold" cache entries. Further, multiple garbage collection operations may be needed to fully collect a soft referenced cache. Each garbage collection may occur at an inopportune time, each time causing the JVM to pause, thereby significantly impacting performance of the JVM and applications running therein.

SUMMARY

One or more embodiments of the present disclosure provide methods, systems, and computer programs for managing memory in a host computer system in which virtual machines (VMs) execute. In one embodiment, an application executing within a runtime environment (e.g., JVM) may use an elastic cache comprised of a plurality of objects within heap memory to store cache data. A balloon agent running within JVM is configured to inflate and deflate a memory balloon with the runtime environment according to memory pressure indications provided from outside the VMs (e.g., by a hypervisor). To inflate the balloon, the balloon agent re-purposes objects (or in some cases, allocates new objects) from the elastic cache, overwrites cache data within the objects with a predetermined value, and notifies a hypervisor that memory pages containing the objects may be page-shared and reclaimed for other uses. To deflate the balloon, the balloon agent repurposes one or more of the objects under its control to be once again used in the elastic cache. Accordingly, embodiments of the present disclosure provide a memory balloon and application-level cache comprised of objects that persist within memory, reducing the number of dead objects in the JVM heap that may cause garbage collection that impacts performance of application running within the JVM.

A method for managing memory of a runtime environment executing on a virtual machine, according to one embodiment, includes the steps of receiving cache data from an application executing in the runtime environment and storing the received cache data in one or more objects within heap memory of the runtime environment. The method further includes determining, by operation of a memory management agent, a target size for memory to be reserved within heap memory of the runtime environment, identifying at least one of the objects stored in the heap memory that store cache data for the application, and replacing at least some portion of the cache data stored in the identified objects with a first value. The method includes notifying a hypervisor that at least one machine physical memory page associated with the identified object and having the first value, can be re-claimed.

Further embodiments of the present invention include, without limitation, a non-transitory computer-readable storage medium that includes instructions that enable a processing unit to implement one or more of the methods set forth above or the functions of the computer system set forth above.

DETAILED DESCRIPTION

Figure 1:
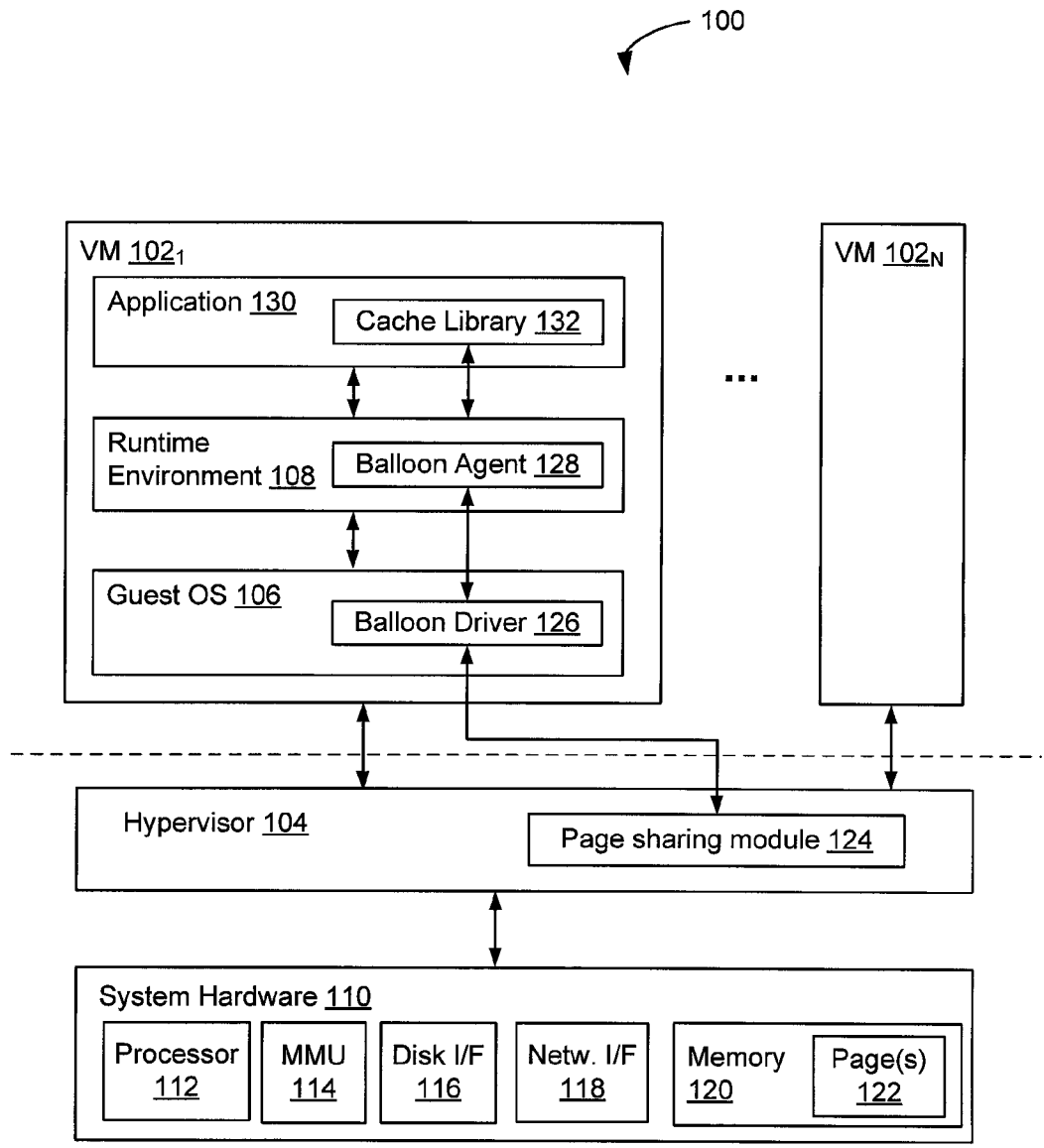
FIG. 1 is a block diagram that illustrates a virtualized computer system with which one or more embodiments of the present invention may be utilized.

FIG. 1 is a block diagram that illustrates a virtualized computer system 100 with which one or more embodiments of the present invention may be utilized. Computer system 100 (also referred to as a "server" or "host") is configured to support a virtualized environment comprised of one or more virtual machines.

As in conventional computer systems, computer system 100 includes both system hardware 110 and system software. System hardware 110 generally includes a processor 112, some form of memory management unit (MMU) 114 (which may be integrated with processor 112), a disk interface 116, a network interface 118, and memory 120 (referred to herein as "machine memory"). Machine memory 120 stores data and software such as an operating system and currently running application programs. Generally, MMU 114 is responsible for managing a virtual memory for processes running in computer system 100 by mapping virtual memory pages to machine memory pages. MMU 114 typically divides virtual memory address space and machine memory address space into blocks of contiguous memory addresses referred to as memory pages 122. Processor 112 may be a single processor, or two or more cooperating processors in a known multiprocessor arrangement. Examples of disk interface 116 are a host bus adapter and a network file system interface. An example of network interface 118 is a network adapter, also referred to as a network interface controller (NIC). In some embodiments, a plurality of NICs is included as network interface 118. It should further be recognized that system hardware 110 also includes, or is connected to, conventional registers, interrupt handling circuitry, a clock, etc., which, for the sake of simplicity, are not shown in the figures.

One or more virtual machines (VMs), represented by VM $102_1$ to VM $102_N$, are configured within computer system 100 and share the hardware resources of computer system 100. Each virtual machine typically includes a guest operating system (OS) 106 and virtualized system hardware (not shown), which includes one or more virtual CPUs, virtual system memory, one or more virtual disks, one or more virtual devices, etc., all of which are implemented in software to emulate the corresponding components of an actual computer.

The virtual machines run on top of a hypervisor 104 (sometimes referred to as a virtual machine monitor, or VMM), which is a software interface layer that abstracts system hardware 110 into virtualized hardware, thereby enabling sharing of system hardware 110 of computer system 100 amongst the virtual machines. Hypervisor 104 acts as an interface between VM $102_1$ and system hardware 110 for executing VM-related instructions and for transferring data to and from machine memory 120, processor(s) 112, disk interface 116, etc. Hypervisor 104 may run on top of an operating system of computer system 100 or directly on hardware components of computer system 100.

In one embodiment, hypervisor 104 includes a page sharing module 124 configured to perform a page sharing process, according to one embodiment, on guest physical memory pages utilized by VM $102_1$. As described in detail later, page sharing module 124 is configured to re-map guest physical memory pages assigned to VM $102_1$ and runtime environments 108 having the same contents to a same machine memory page 122. For clarity of discussion, the term machine memory refers to actual hardware memory that is visible to hypervisor 104. The term guest physical memory refers to a software abstraction used to provide the illusion of hardware memory to a VM. Guest physical memory is generally visible to a guest OS running on a VM. Guest physical memory is backed by machine memory and hypervisor 104 provides a mapping from guest physical memory to machine memory. The term guest virtual memory refers to a continuous virtual address space presented by a guest OS to applications running inside a VM.

VM $102_1$ is configured to support a runtime environment 108 running on top of guest OS 106. To simplify the description, description of other VMs $102_N$ are omitted but it should be understood that VMs $102_N$ are configured similarly to VM $102_1$. In the embodiments illustrated herein, runtime environment 108 is a Java Virtual Machine (JVM), although it should be recognized that other runtime environments and/or applications executing on top of the guest OS and having their own memory manager, such as databases, web servers, etc., may be used without departing from the scope of the teachings herein. The embodiments presented should therefore not be interpreted to be exclusive or limiting, but rather exemplary or illustrative.

Runtime environment 108 is configured to run one or more applications 130 to provide, for example, web services, database services, and other information technology services that may involve retrieval, processing, and serving of data to one or more users. To improve performance and reduce latency, applications 130 may utilize a cache library 132 that provides a mechanism for temporarily storing copies of data used by application 130 for later use. By way of example, data used by application 130 that are suitable for caching include web session data, object-relational mappings, database query results, and compiled byte code. According to one embodiment, cache library 132 is configured to coordinate with runtime environment 108 to store cache data in one or more objects created within memory that may also be used by a balloon agent 128 of runtime environment 108, as described in detail below.

Runtime environment 108 of VM $102_1$ is configured to coordinate with hypervisor 104 to manage memory using a mechanism for balloon memory that performs page sharing procedures on guest physical memory pages utilized by runtime environment 108. According to an embodiment, VM $102_1$ includes a balloon driver 126 installed in guest OS 106 and a balloon agent 128 within runtime environment 108. Balloon driver 126 is a systems-level driver configured to communicate with hypervisor 104 and balloon agent 128 to exert memory pressure on runtime environment 108. For example, when balloon driver 126 receives instructions from hypervisor 104 to inflate, balloon driver 126 requests balloon agent 128 to inflate, rather than requesting for memory pages directly from guest OS 106.

Balloon agent 128 is a thread or process executing within runtime environment 108 configured to manage heap memory of runtime environment 108. Responsive to commands and/or signals provided by hypervisor 104 via balloon driver 126, balloon agent 128 inflates by allocating and freeing one or more objects within heap memory to effectively reduce the heap space that can be used by runtime environment 108 and any applications 130 running therein. A smaller heap may cause garbage collection of runtime environment 108 to run more frequently, which decreases throughput. Further, repeated allocation and discarding of objects within heap memory may further decrease performance of runtime environment 108. As such, according to one embodiment of the present disclosure, balloon agent 128 is configured to retrieve objects within heap memory that are used by application 130 for storage cache data and repurpose the objects for use in ballooning. An example technique for implementing balloon memory is further described in more detail in U.S. patent application Ser. No. 12/826,389, filed Jun. 29, 2010, and entitled "Cooperative Memory Resource Management via Application-Level Balloon," which is incorporated herein by reference.

Figure 2:
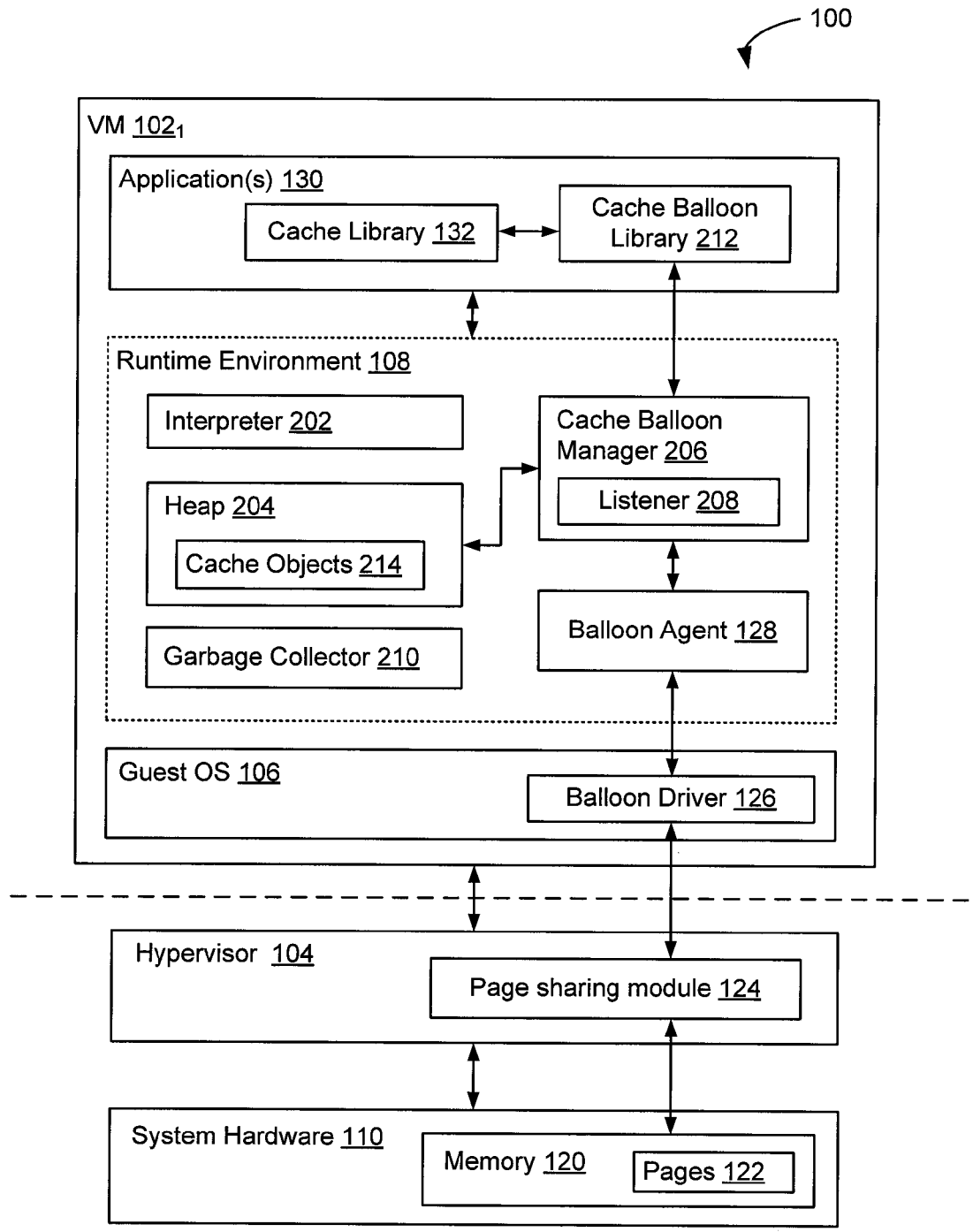
FIG. 2 illustrates, in greater detail, the virtualized computer system of FIG. 1 configured to perform memory management techniques while executing a runtime environment, according to one or more embodiments.

FIG. 2 illustrates, in greater detail, a VM $102_1$ configured to perform memory management techniques, according to one or more embodiments, while executing runtime environment 108. Runtime environment 108 includes an interpreter 202, a heap 204, and a garbage collector 210 to support execution of one or more applications 130 within runtime environment 108. Interpreter 202 is configured to translate and execute software code (i.e., byte code) of application 130. Garbage collector 210 is a memory manager for runtime environment that attempts to reclaim heap memory occupied by objects in heap 204 no longer used by runtime environment 108 or applications 130 running therein. Heap 204 comprises a region of memory (referred to herein as "heap memory") reserved for storing one or more objects (e.g., Java objects) and other data structures utilized during execution of application 130. Heap 204 is illustrated in greater detail and described further in conjunction with FIG. 3.

Runtime environment 108 further includes a cache balloon manager 206 configured to allocate one or more cache objects 214 within heap 204 for use by applications 130 to cache temporarily data and for use by balloon agent 128 to occupy space within heap memory as a memory balloon. Cache balloon manager 206 provides a centralized interface by which both applications 130 and balloon agent 128 alike may request new cache objects 214, access existing cache objects 214, and perform other operations on cache objects 214. Cache balloon manager 206 maintains states for each of cache objects 214 residing within heap memory that indicates the contents of cache object 214, for example, that a given cache object 214 is available for storing cache data. Cache objects 214 are illustrated in greater detail in FIG. 3.

Figure 3:
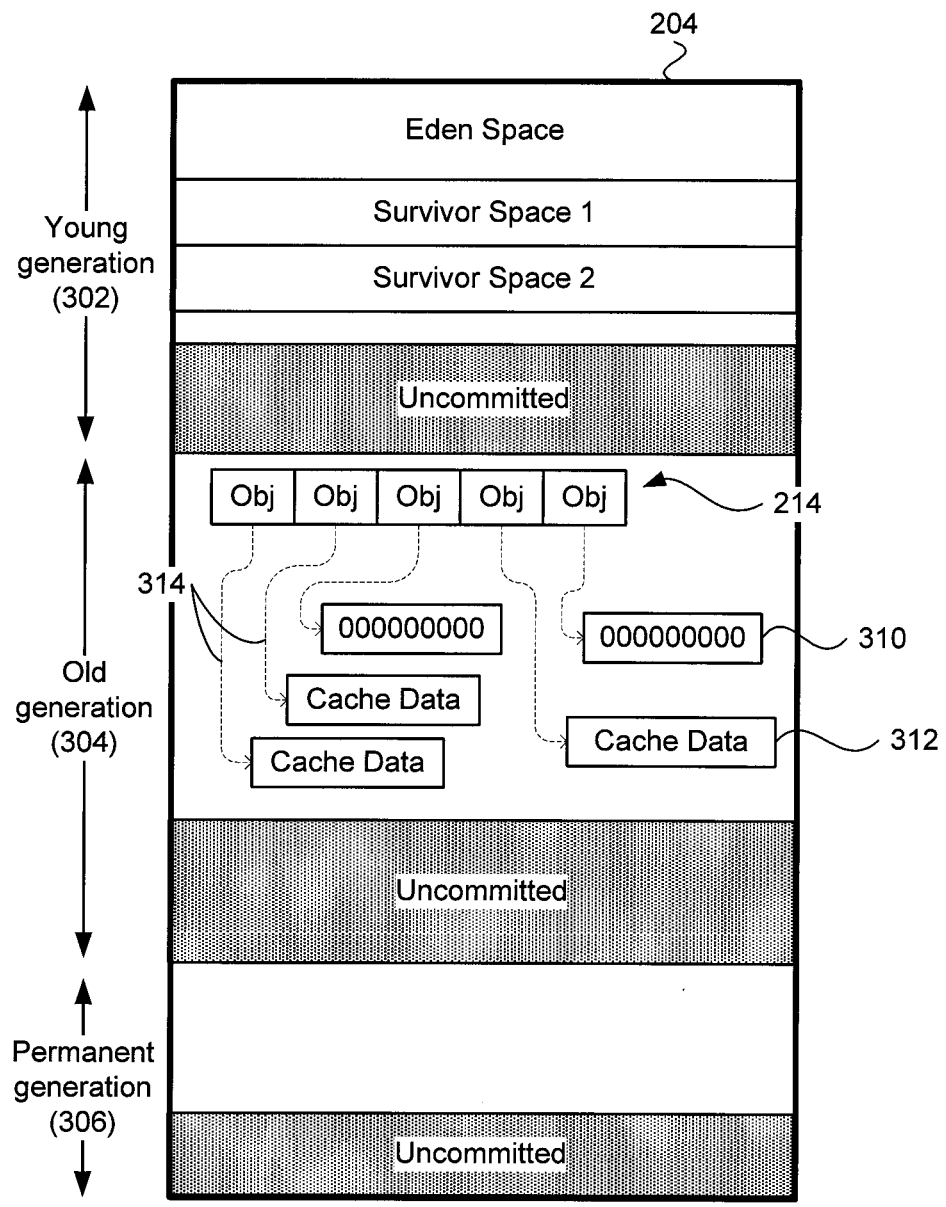
FIG. 3 depicts a layout of a Java memory heap while a memory management technique is performed, according to one or more embodiments.

FIG. 3 depicts a layout of heap 204 having cache objects 214 residing therein, according to one or more embodiments. While an embodiment based on OpenJDK, an open source JVM implementation from Oracle Corporation, is depicted, principles of the present disclosure can also be used with other JVM implementations.

Heap 204 is divided into regions of young, old, and permanent generations 302, 304, 306, respectively. Permanent generation 306 holds static data, such as class descriptions, and has its own form of memory management. New objects are allocated into an "eden" space of young generation 302. Once the eden space is exhausted, runtime environment 108 may start a minor garbage collection operation, where live objects (i.e., reachable) are copied into a "survivor" space. In the embodiment illustrated herein, there are two survivor spaces, which serve alternately as the destination of live objects from the eden space or from the other survivor space. Objects stay in young generation 302 until the objects live long enough to be promoted into old generation 304, sometimes referred to as "tenured space." When old generation 304 runs out of space, a major garbage collection happens and live objects are copied and compacted within old generation heap 304 to create free space.

Known techniques for application-level caching have used one of a variety of mechanisms of adding and removing temporary objects allocated within heap 204. In one example, a cache may be implemented using soft-referenced objects, which are objects that can be garbage collected even though the objects are in use when garbage collector 210 determines that little to no memory (e.g., in old generation 304) is available. However, it has been determined that this approach to caching leads to unpredictable performance costs due to the lack of control over garbage collection and the pause time incurred while garbage collection occurs. Further, it has been determined that known techniques for caching may not be responsive to memory management techniques used in virtualized environments with memory over-commitment. For example, a JVM executing within a VM may be unaware of outside memory pressure (e.g., from hypervisor) and may not release cached data in heap memory that would help the performance of the whole system, particularly if that JVM is relatively idle. As such, according to one embodiment, cache balloon manager 206 uses cache objects 214 within heap 204 to provide application-level caching when no memory pressure is being exerted by hypervisor 104 and deterministically removes the cached data from heap 204 without incurring the cost of garbage collection.

In one embodiment, cache objects 214 are wrapper objects that encapsulate one or more regions of data for use in application-level caching or in memory ballooning. In some embodiments, the data region for each cache object 214 is configured in a format that cache balloon manager 206 may determine a page address of an underlying guest physical memory page within heap 204 (e.g., via a Java Native Interface (JNI) call). In the embodiment shown in FIG. 3, the region of data for each cache object 214 is arranged as a byte array (e.g., byte arrays 310, 312), although other suitable data structures and formats may be utilized. Rather than allowing direct access to the data regions, cache objects 214 expose the one or more regions of data to applications 130 and balloon agent 128 using accessor and mutator methods (e.g., getRegion( ) setRegion ( )). In some embodiments, data regions of cache objects 214 may be configured to store cache data, as illustrated by byte array 312, or to be used as part of a memory balloon, as illustrated by the zeroed out byte array 310.

Each cache object 214 includes a reference 314 to a data region (e.g., byte array) allocated within heap memory. In some embodiments, reference 314 may be configured as a soft reference, which denotes a type of object that may be taken away at the discretion of garbage collector 210 in response to memory demands. In one implementation, an accessor method (e.g., getRegion( )) of cache objects 214 may be configured to check if soft referenced data regions have been taken away, and may throw an exception if access to such a data region is attempted. While references 314 to data regions may be soft references, references to cache objects 214 themselves, such as those maintained by cache balloon manager 206, may remain as strong references (i.e., hard references) to ensure tenancy of cache objects 214 within heap memory.

In some embodiments, cache objects 214 are wrapper objects configured to prevent synchronous access from both an application 130 and/or a balloon agent 128. Cache objects 214 may further include additional metadata that facilitates memory management operations described herein. For example, cache objects 214 may include an internal counter indicating a number of times the cache object has been used for memory ballooning or for cache data, a timestamp indicating a date and time of last utilization, etc.

Returning to FIG. 2, balloon agent 128 is configured to request one or more cache objects 214 from cache balloon manager 206 responsive to memory demands from balloon driver 126 and hypervisor 104. Balloon agent 128 is further configured to notify, or "hint" to hypervisor 104 that guest physical memory pages backing cache objects 214 as candidates for page sharing. In one implementation, balloon driver 126 may communicate with hypervisor 104 via a backdoor call and provides a page sharing hint comprising an address of a candidate guest physical memory page (e.g., a guest physical page number.) Accordingly, balloon agent 128 coordinates with balloon driver 126 and hypervisor 104 to utilize page sharing techniques on guest physical memory pages that are reserved for heap 204 and that may have been used for cache data by applications 130.

In one embodiment, cache balloon manager 206 includes a listener component 208 configured to receive registrations from any applications 130 that have stored data in a particular cache object. Listener component 208 is further configured to notify the registered applications when that particular cache object is about to be affected, for example, re-purposed for ballooning, garbage collected, etc. In some embodiments, listener component 208 is configured to interact with registered applications 130 to enable applications 130 to veto an impending removal of cache data from the particular cache object 214.

To enable access to one or more cache objects 214 managed by cache balloon manager 206, cache library 132 of application 130 may use a utility library, such as a cache balloon library 212, that is configured to provide an application-side interface (e.g., API) to cache balloon manager 206. In some embodiments, functionality of cache balloon library 212 may be incorporated within cache library 132 or may be separate components as shown in FIG. 2. Operations of application 130 for caching data within heap memory using cache objects 214 is described in greater detail in conjunction with FIG. 4.

Example of Application-Level Caching

Figure 4:
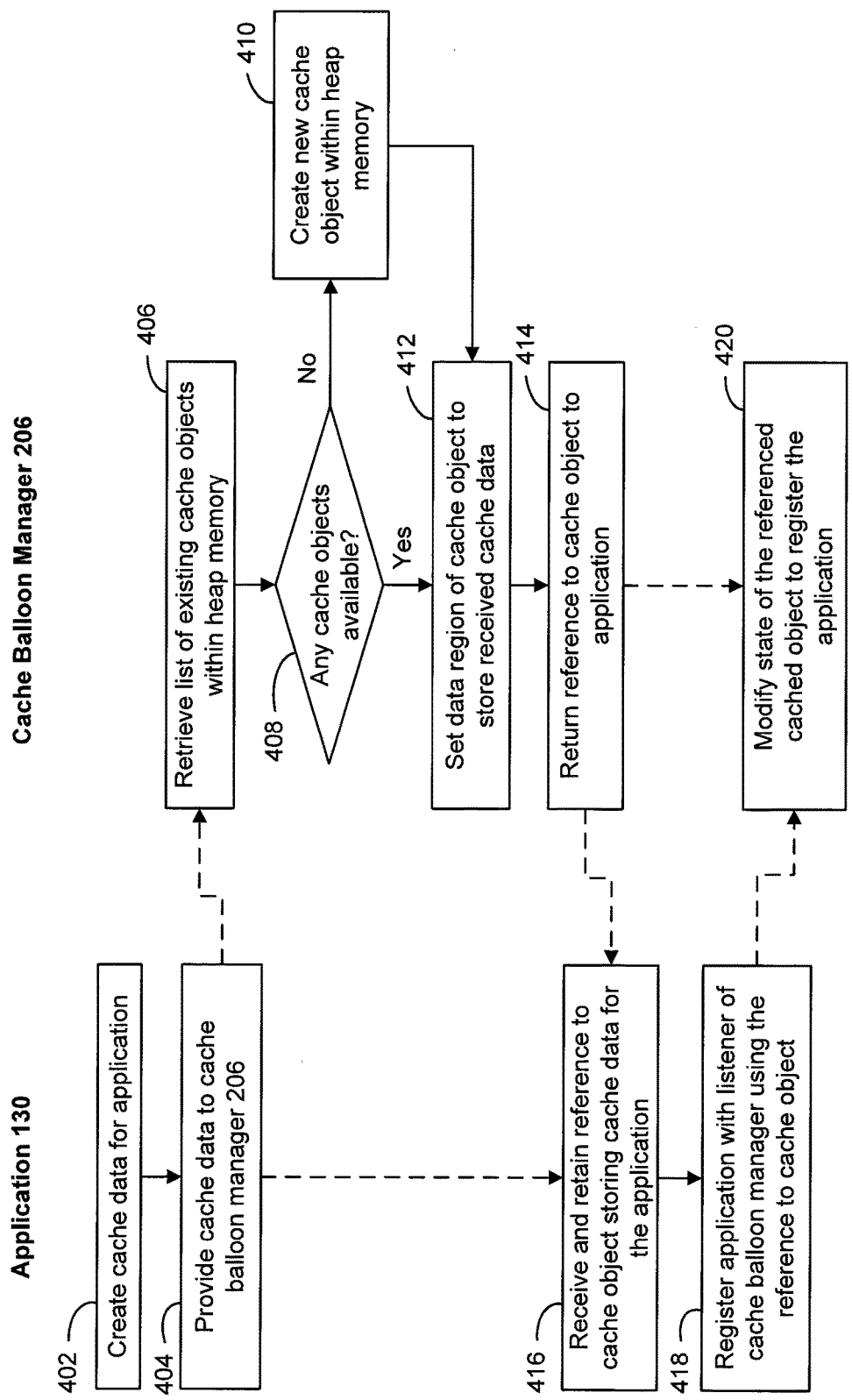
FIG. 4 is a flow diagram that illustrates steps for a method of caching application data in a managed memory reserved to a runtime environment, according to an embodiment of the present invention.

FIG. 4 is a flow diagram that illustrates steps for a method of caching application data in a managed memory reserved to runtime environment 108, according to an embodiment of the present invention. It should be recognized that, even though the method is described in conjunction with the systems of FIG. 1 and FIG. 2, any system configured to perform the method steps is within the scope of embodiments of the invention.

At step 402, application 130 generates cache data to be stored within memory for later use. In step 404, application 130 provides the cache data to cache balloon manager 206 to provision a cache object 214 that encapsulates the provided cache data. In one implementation, application 130 creates a byte array having the cache data stored therein and passes the byte array to cache balloon manager 206. In some embodiments, application 130 utilizes a constructor method of cache balloon library 212 to obtain a cache object 214 for its use. Cache balloon library 212 in turn invokes cache balloon manager 206 to obtain a reference to a cache object 214. Responsive to receiving the cache data from application 130, cache balloon manager 206 may provision a cache object 214 from cache objects already existing within heap 204 or create a new cache object within heap memory. It should be recognized that application 130 may request provision of a cache object without providing cache data (e.g., via a default constructor method).

In step 406, cache balloon manager 206 retrieves a list of existing cache objects 214 within heap memory. In some embodiments, the list of existing cache objects may include a plurality of "strong" references to cache objects 214. In step 408, cache balloon manager 206 determines whether any of the existing cache objects 214 are available for use. As described above, cache balloon manager 206 tracks the state of cache objects 214 that categorizes the contents of each cache object 214. In some embodiments, a state of a cache object may indicate that the cache object is available for storing cache data, that a given cache object 214 is currently being used for balloon memory (i.e., unavailable), whether a given cache object 214 has been garbage collected. In some embodiments, a state of a cache object may indicate that a cache object is currently storing cache data for a particular application. Such cache objects may nonetheless be re-used for storing cache data of another application.

In step 410, responsive to determining that no existing cache objects are available for storing cache data, cache balloon manager 206 creates a new cache object 214 within heap memory and proceeds to step 412. In some embodiments, cache balloon manger 206 may set a state of cache object 214 within heap 202 indicating an availability of cache object 214 to store cache data. It should be recognized that step 410 may be performed by cache balloon manager 206 when there are little or no cache objects existing, such as at a time when a runtime environment 108 initially starts running. In one implementation, cache balloon manager 206 may allocate new cache objects according to a pre-determined cache size limit. In some embodiments, cache balloon manager 206 may continue to allocate new cache objects until a pre-determined size limit for all cache objects within heap memory has been reached. In some embodiments, cache balloon manager 206 may allocate new cache objects even though available cache objects exist within heap memory until the pre-determined cache size limit has been reached, at which point existing cache objects are re-used and re-purposed.

Newly-created cache objects 214 may be configured for a dual use in storing application-level cache data and for memory ballooning. In some embodiments, to facilitate page sharing, cache objects 214 may be created having an object size selected to be at least the size of one page of machine memory in system hardware 110 (e.g., 4 MB) though other sizes are possible, such as multiple pages of memory. Generally, the use of large objects reduces the number of objects balloon agent 128 needs to handle for meeting a large balloon target. However, because cache objects 214 are repeatedly re-used by both data caches and memory ballooning without incurring the cost of new object creation, embodiments of the present disclosure advantageously permit a smaller size of cache objects 214 to be selected to provide increased storage granularity and flexibility between data caching and memory ballooning.

Responsive to determining that at least one cache object 214 is available for storing cache data, in step 412, cache balloon manager 206 identifies the available cache object and sets a data region of cache object 214 to store the received cache data. Cache balloon manager 206 allocates and includes a data region object (e.g., byte array) for cache object 214. Alternatively, cache balloon manager 206 may store a reference to a pre-existing byte array provided by application 130 and containing the cache data. In embodiments where cache balloon manager 206 provides the data region objects, cache balloon manager 206 may copy data from a data structure (e.g., byte array) provided by application 130 into the data region of cache object 214. In cases where a cache balloon manager 206 is not provided with cache data (e.g., via default constructor), a byte array is still allocated for cache object 214 and may be set (e.g., via a mutator method) at a later time. In embodiments where cache balloon manager 206 stores a pre-existing byte array provided by application 130, cache balloon manager 206 may create a new wrapper object 214 to represent and track the state of the pre-existing byte array. In such embodiments, it should be recognized that application 130 gives up direct control of that byte array and later interacts with the byte array via wrapper cache object 214. As described above, the reference to the data region of cache object 214 may be a soft reference to permit garbage collection to discard the cached data in response to memory demands. In step 414, cache balloon manager 206 returns a reference to cache object 214 to application 130. In step 416, application 130 receives and retains the reference to cache object 214 that is now storing cache data. Data can only ever be read from or written to the cache by invoking wrapper methods on cache object 214. In some embodiments, application 130 may choose to invoke the wrapper methods of cache object 214 to read and write certain portions, rather than the entirety, of the data region. In one implementation, application 130 invokes accessor and mutator methods (e.g., setRegion( ), getRegion( )) on any index in cache object 214 to read and write cache data to that portion of the byte array within cache object 214. Cache balloon library 212 may be configured to track such indexes to maintain records of where cache data is stored within a particular data region of cache object 214.

Cache data used by application 130 is generally some copy or version of persistent application-level data used primarily to improve performance of application 130. As such, cache data may generally be discarded without affecting application state or operation, should computing resources (e.g., memory) become scarce. However, in some cases, application 130 may wish to create a copy cache data or perform some "last-chance" action just before cache data is discarded, such as a copy or saving operation. Accordingly, in some embodiments, in step 418, application 130 may register with listener component 208 of cache balloon manager 206 to signal interest in cache data of a particular cache object 214. In step 420, cache balloon manager 206 modifies state of the referenced cache object to register application 130. In some embodiments, cache balloon manager 206 may modify a central listing of cache objects to include an association between application 130 and one or more cache objects 214 storing cache data for application 130.

Example of Memory Ballooning

Embodiments of the present disclosure provide a mechanism to repurpose Java objects storing application-level cache data within heap memory for management of memory assigned to the JVM and underlying VM. In some embodiments, the mechanism provides a memory balloon that "inflates" by re-using cache objects to store zeroed out memory pages within the Java heap and invoking page sharing on the zeroed out memory pages, as described further in FIG. 5.

Figure 5:
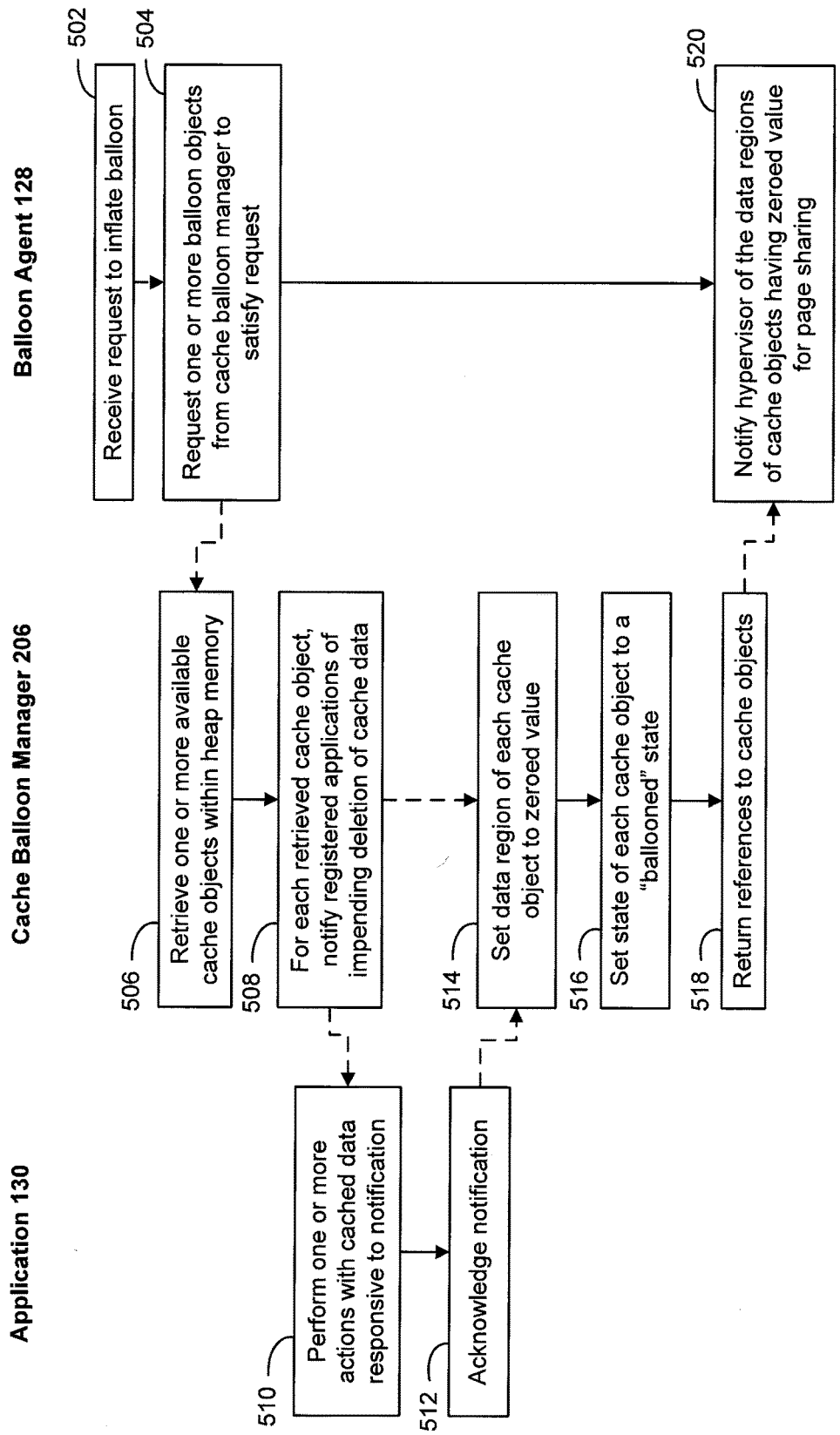
FIG. 5 is a flow diagram that illustrates steps for a method of managing memory assigned to a runtime environment, according to an embodiment of the present invention.

FIG. 5 is a flow diagram that illustrates steps for a method of managing memory assigned to a runtime environment, according to an embodiment of the present invention. It should be recognized that, even though the method is described in conjunction with the systems of FIG. 1 and FIG. 2, any system configured to perform the method steps is within the scope of embodiments of the invention.

In step 502, balloon agent 128 receives a request to inflate balloon memory within runtime environment 108. In some embodiments, balloon agent 128 may periodically poll for a new balloon target size from balloon driver 126 and determine whether the new target size for memory balloon is greater than or less than a current size of memory balloon. In another embodiment, the communication between balloon agent 128 and balloon driver 126 within guest OS 106 is through standard posix system calls.

In step 504, balloon agent 128 requests one or more balloon objects from cache balloon manager 206 having a size within memory sufficient to satisfy the memory demands. In some embodiments, balloon object 128 may request a plurality of balloon objects having a pre-determined data region size that may be page shared to reclaim an amount of heap memory that satisfies the memory demand.

In step 506, cache balloon manager 206 retrieves one or more available cache objects 214 allocated within heap memory. Cache objects 214 may be created anew or retrieved from a list of existing cache objects within heap memory. In some embodiments, a cache object 214 is deemed "available" for memory ballooning even though the cache object has a state indicating the cache object is already being used to store application-level cache data. As such, cache objects 214 are part of an "elastic" cache that permits its memory space to be reclaimed when VMs $102_1$ to $102_N$ are under memory pressure from host 100 and hypervisor 104.

In step 508, for each retrieved cache object 214, cache balloon manager 206 notifies any applications (e.g., application 130) that have registered with listener component 208 of an impending deletion of existing cache data stored in a data region of each cache object. In some embodiments, cache balloon manager 206 may invoke a callback function that was provided by an application 130 during a registration process (e.g., performed in step 418). In step 510, response to notification of an impending deletion of cache data, application 130 may perform one or more actions using the cache data, for example, copying out the data to a more persistent or permanent location. In step 512, application 130 may transmit an acknowledgement to cache balloon manager 206 to enable cache balloon manager 206 to proceed with overriding cache object for memory ballooning. In alternative embodiment, application 130 may transmit a "veto" signal, or request, that indicates cache balloon manager 206 should skip the retrieved cache object and attempt to use a different cache object for ballooning.

In step 514, cache balloon manager 206 sets a data region of retrieved cache object 214 to a pre-determined value. In one implementation, cache balloon manager 206 invokes a mutator method (e.g., setRegion( )) of a particular cache object 214 to store a value within the data region of cache object 214. In some embodiments, cache balloon manager 206 zeroes out (i.e., stores a zero value within) within the data region of cache object 214 to enable a page sharing process of guest physical memory pages assigned to heap 204. In some embodiments, cache balloon manager 206 may set a portion of the data region of a cache object 214 sufficient to satisfy a memory demand indicated by balloon agent 128. The portion may be less than the entire size of the data region to enable granularized control of a memory balloon. For example, in a case where balloon agent 128 calls for reclamation of 70 MB of heap memory, cache balloon manager may retrieve 18 cache objects having 4 MB data regions, zeroing out the data regions of 17 cache objects and only set a half portion of the data region of the 18$^{th}$ cache object, In step 516, cache balloon manager 206 updates state of the retrieved cache object 214 to indicate cache object 214 is being used as part of a memory balloon, e.g., a "ballooned" state. In some embodiments, cache balloon manager 206 sets a state for retrieved cache object 214 indicating at least a portion of the data region of retrieved cache object 214 has been zeroed out to be part of a memory balloon. Accordingly, such cache objects 214 are unavailable in any later requests for storing application-level cache data. In step 518, cache balloon manager 206 returns references to the cache objects to balloon agent 128. Balloon agent 128 may maintain a list of references to cache objects that make the memory balloon with heap 204.

In step 520, balloon agent 128 notifies hypervisor 104 of the data regions contained within received cache objects 214 having the pre-determined value to perform a page sharing operation. In some embodiments, balloon driver 126 may notify hypervisor 104, for example, via a backdoor call, of the one or more guest physical memory pages containing data regions ("hinted memory pages"). The backdoor call may include page address of the hinted guest physical memory page (e.g., physical page number, or PPN).

Balloon driver 126, balloon agent 128, and hypervisor 104 subsequently perform an operation for page-sharing, as described in detail in U.S. patent application Ser. No. 12/826,389, specified above. For example, page sharing module 124 may maps the hinted guest physical memory page with a matched guest physical memory page to a same machine memory page 122. Page sharing module 220 may modify one or more internal references in a page table to associate the hinted guest physical memory page with the matched memory page such that only one copy of the memory page needs be retained within machine memory 120. That is, only one copy of the data region within heap memory needs to be retained within machine memory 120. It is noted that if a later access attempts to modify the shared machine memory page 122 (e.g., later cache data) hypervisor 104 immediately makes a copy of the shared memory as per a copy-on-write (COW) technique. Hypervisor 104 reclaims a machine memory page 122 previously utilized by the hinted guest physical memory page assigned to runtime environment 108 and makes the de-allocated machine memory page available to other processes executing on host computer system 100, such as other VMs and/or other runtime environments 108.

Figure 6:
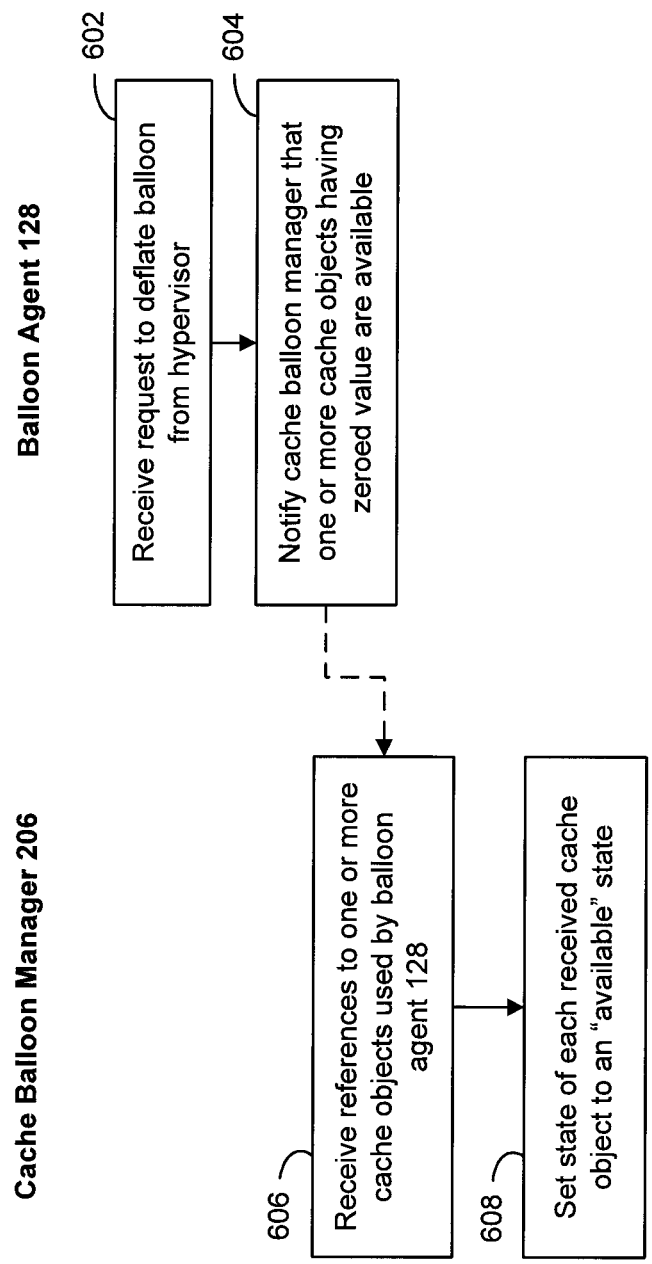
FIG. 6 is a flow diagram that illustrates steps for a method of managing memory assigned to a runtime environment, according to an embodiment of the present invention.

According to one embodiment, to "deflate" the memory balloon for runtime environment 108, balloon agent 128 releases cache objects from the memory balloon and enables them to be repurposed for application-level caching, as described in FIG. 6. FIG. 6 is a flow diagram that illustrates steps for a method of managing memory assigned to a runtime environment, according to an embodiment of the present invention. It should be recognized that, even though the method is described in conjunction with the systems of FIG. 1 and FIG. 2, any system configured to perform the method steps is within the scope of embodiments of the invention.

In step 602, balloon agent 128 receives a request to deflate balloon from hypervisor 104. In some embodiments, balloon agent 128 determines a target size for balloon is less than a current memory size of runtime environment 108. In step 604, balloon agent 128 notifies cache balloon manager 206 that one or more particular cache objects 214 having zeroed value are no longer needed for memory ballooning. In step 606, cache balloon manager 206 receives references to one or more cache objects 214 used by balloon agent 128 and an indication that the cache objects may now be available for other purpose (e.g., application level caching).

In step 608, cache balloon manager 206 sets state of each received cache object 214 to an "available" state. Accordingly, cache objects 214 may continually be re-purposed for use as an application-level cache (as described in conjunction with FIG. 4) or as a memory balloon. As such, cache objects 214 configured according to embodiments of the disclosure persist in heap memory without having to constantly create and discard temporary objects, which may incur object creation costs or may invoke garbage collection.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. For example, runtime environment 108 may generally utilize guest virtual memory pages rather than guest physical memory pages and the backdoor call mechanisms (e.g., hypervisor-aware drivers within guest OS 106, etc.) utilized by runtime environment 108 to communicate with hypervisor 104 that may translate guest virtual memory page references received from runtime environment 108 to guest physical memory page references prior to providing them to hypervisor 104. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing memory of a runtime environment executing in a virtual machine, the method comprising:
    receiving cache data from an application executing in the runtime environment and storing the received cache data in one or more objects within heap memory of the runtime environment;
    determining, by operation of a memory management agent, a first target size for memory to be reserved within heap memory of the runtime environment;
    identifying at least one of the objects stored in the heap memory that store cache data for the application;
    replacing at least some portion of the cache data stored in the identified object with a first value; and
    notifying a hypervisor that at least one machine physical memory page associated with the identified object and having the first value, can be re-claimed.

2. The method of claim 1, wherein the one or more objects further comprises a wrapper object having a soft reference to a data structure containing the cache data.

3. The method of claim 1, further comprising:
    setting a state for at least one of the objects within heap memory indicating an availability of each object to store cache data.

4. The method of claim 1, further comprising:
    setting a state for at least one of the identified objects within heap memory indicating the at least one identified objects have the first value and are part of a memory balloon.

5. The method of claim 1, further comprising:
    registering the application executing in the runtime environment and an association with the one or more objects storing cache data for the application; and
    prior to replacing the at least some portion of the cache data, notifying the registered application of a change to the cache data.

6. The method of claim 5, further comprising:
    receiving a veto request, from the registered application, indicating the one or more objects storing cache data; and
    requesting an different one of the objects stored in heap memory from the one or more objects storing cache data for the registered application.

7. The method of claim 1, further comprising:
    determining, by operation of the memory management agent, a second target size for memory to be reserved within heap memory of the runtime environment, the second target size being less than the first target size;
    retrieving the objects stored in the heap memory that store the first value; and
    setting a state for each of the objects indicating each object is available to store cache data.

8. A non-transitory computer-readable storage medium comprising instructions that, when executed in a computing device, manage memory of a runtime environment executing in a virtual machine, by performing the steps of:
    receiving cache data from an application executing in the runtime environment and storing the received cache data in one or more objects within heap memory of the runtime environment;
    determining, by operation of a memory management agent, a first target size for memory to be reserved within heap memory of the runtime environment;
    identifying at least one of the objects stored in the heap memory that store cache data for the application;
    replacing at least some portion of the cache data stored in the identified object with a first value; and
    notifying a hypervisor that at least one machine physical memory page associated with the identified object and having the first value, can be re-claimed.

9. The non-transitory computer-readable storage medium of claim 8, wherein the one or more objects further comprises a wrapper object having a soft reference to a data structure containing the cache data.

10. The non-transitory computer-readable storage medium of claim 8, further comprising instructions for:
    setting a state for at least one of the objects within heap memory indicating an availability of each object to store cache data.

11. The non-transitory computer-readable storage medium of claim 8, further comprising instructions for:
  setting a state for at least one of the identified objects within heap memory indicating the at least one identified objects have the first value and are part of a memory balloon.

12. The non-transitory computer-readable storage medium of claim 8, further comprising instructions for:
  registering the application executing in the runtime environment and an association with the one or more objects storing cache data for the application; and
  prior to replacing the at least some portion of the cache data, notifying the registered application of a change to the cache data.

13. The non-transitory computer-readable storage medium of claim 12, further comprising instructions for:
  receiving a veto request, from the registered application, indicating the one or more objects storing cache data; and
  requesting an different one of the objects stored in heap memory from the one or more objects storing cache data for the registered application.

14. The non-transitory computer-readable storage medium of claim 8, further comprising instructions for:
  determining, by operation of the memory management agent, a second target size for memory to be reserved within heap memory of the runtime environment, the second target size being less than the first target size;
  retrieving the objects stored in the heap memory that store the first value; and
  setting a state for each of the objects indicating each object is available to store cache data.

15. A computer system for managing memory of a runtime environment executing in a virtual machine, the computer system comprising:
  a system memory comprising a plurality of machine physical memory pages; and
  a processor programmed to carry out the steps of:
    receiving cache data from an application executing in the runtime environment and storing the received cache data in one or more objects within heap memory of the runtime environment;
    determining, by operation of a memory management agent, a first target size for memory to be reserved within heap memory of the runtime environment;
    identifying at least one of the objects stored in the heap memory that store cache data for the application;
    replacing at least some portion of the cache data stored in the identified object with a first value; and
    notifying a hypervisor that at least one machine physical memory page associated with the identified object and having the first value, can be re-claimed.

16. The computer system of claim 15, wherein the one or more objects within the heap memory of the runtime environment further comprises a wrapper object having a soft reference to a data structure containing the cache data.

17. The computer system of claim 15, wherein the processor is further programmed to carry out the step of:
  setting a state for at least one of the objects within heap memory indicating an availability of each object to store cache data.

18. The computer system of claim 15, wherein the processor is further programmed to carry out the step of:
  setting a state for at least one of the identified objects within heap memory indicating the at least one identified objects have the first value and are part of a memory balloon.

19. The computer system of claim 15, wherein the processor is further programmed to carry out the step of:
  registering the application executing in the runtime environment and an association with the one or more objects storing cache data for the application; and
  prior to replacing the at least some portion of the cache data, notifying the registered application of a change to the cache data.

20. The computer system of claim 19, wherein the processor is further programmed to carry out the step of:
  receiving a veto request, from the registered application, indicating the one or more objects storing cache data; and
  requesting an different one of the objects stored in heap memory from the one or more objects storing cache data for the registered application.

21. The computer system of claim 15, wherein the processor is further programmed to carry out the step of:
  determining, by operation of the memory management agent, a second target size for memory to be reserved within heap memory of the runtime environment, the second target size being less than the first target size;
  retrieving the objects stored in the heap memory that store the first value; and
  setting a state for each of the objects indicating each object is available to store cache data.

* * * * *